United States Patent [19]

Outa

[11] Patent Number: 5,049,985
[45] Date of Patent: Sep. 17, 1991

[54] COLOR IMAGES READING APPARATUS HAVING TRANSFORMATION TABLE FORMED BASE ON AVERAGE VALUES OF PLURAL COLOR COMPONENT SIGNALS

[75] Inventor: Ken-Ichi Outa, Yokohama, Japan

[73] Assignee: Canon Kabushiki Kaisha, Tokyo, Japan

[21] Appl. No.: 419,702

[22] Filed: Oct. 11, 1989

[30] Foreign Application Priority Data

Oct. 13, 1988 [JP] Japan ................................. 63-256024
Oct. 13, 1988 [JP] Japan ................................. 63-256025

[51] Int. Cl.⁵ ............................................. G03F 3/10
[52] U.S. Cl. ...................................... 358/76; 358/80
[58] Field of Search ............... 358/75, 76, 80; 355/38, 355/77

[56] References Cited

U.S. PATENT DOCUMENTS

| 4,206,998 | 6/1980 | Tokuda | 355/38 |
| 4,222,661 | 9/1980 | Wahli et al. | 355/38 |
| 4,397,545 | 8/1983 | Terashita | 358/38 |
| 4,468,692 | 8/1984 | Yamada et al. | 358/76 |
| 4,797,712 | 1/1989 | Hayashi et al. | 358/76 |
| 4,922,335 | 5/1990 | Outa et al. | 358/80 |
| 4,975,737 | 12/1990 | Murooka et al. | 355/77 |

Primary Examiner—James J. Groody
Assistant Examiner—Kim Yen Vu
Attorney, Agent, or Firm—Fitzpatrick, Cella, Harper & Scinto

[57] ABSTRACT

A color image reading apparatus has a reading unit for color-separating and reading a color image, an operating unit for obtaining an average value of each of a plurality of color-component signals output from the reading unit, and a transforming unit for transforming the plurality of color-component signals from the reading unit into a plurality of color-density signals on the basis of the average values of the plurality of color-component signals obtained by the operating unit.

17 Claims, 6 Drawing Sheets

COLOR IMAGES READING APPARATUS HAVING TRANSFORMATION TABLE FORMED BASE ON AVERAGE VALUES OF PLURAL COLOR COMPONENT SIGNALS

BACKGROUND OF THE INVENTION:

1. Field of the Invention

The present invention relates to a color image reading apparatus for reading a color image recorded on, e.g., a color negative film.

2. Related Art

The present inventor has proposed an apparatus for photoelectrically reading a color image by using a CCD image sensor for use in a color copying machine, a color facsimile apparatus, or the like in each of U.S. application Nos. 544,240, 061,042 U.S. Pat. No. 4,734,762, and 193,227 U.S. Pat. No. 4,891,690. The present inventor has also proposed an apparatus for reading a color image recorded in a color film on each of U.S. application Nos. 013,731 U.S. Pat. No. 4,933,983 and 119,906 aban. 9/12/89.

In such a color image reading apparatus, unlike in a conventional monochromatic image reading apparatus, an image must be read with not only a high light intensity but also a good color balance. For this purpose, various image processing operations must be performed.

In particular, reading of a color image recorded on a color negative film has the following problems. That is, a color negative film is generally subjected to processing called an orange mask, i.e., a negative image is recorded on an orange-colored base film. Therefore, it is impossible to visually discriminate disturbance in a color balance of a negative film caused by light source conditions and the like upon photography. A color negative film reading apparatus, i.e., a color photograph printing apparatus is conventionally known as an apparatus for correcting a color imbalance to obtain a positive print having a proper color balance.

This color photograph printing apparatus measures an average transmission density of a film for each of R, G, and B by utilizing Evans' theorem, i.e., an empirical principle (U.S. Pat. No. 2,571,697) in which an achromatic color is obtained by averaging colors of a camera subject on an entire frame, compares the measurement value with an average transmission density of a standard negative film, i.e., a negative film photographed outdoors on a fine day with a proper exposure value, and adjusts an exposure time $t_i$ upon printing in accordance with equation (1), thereby obtaining a positive film having a proper color balance (Japanese Patent Publication Nos. 60-46693 and 61-10817);

$$\log t_i = \alpha_i \overline{D}_i + \beta_i \quad (1)$$

where $t_i$: an exposure time (i = R, G, and B) for each of R, G, and B $\overline{D}_i$: an average transmission density of a negative film to be printed $\alpha_i, \beta_i$ = constants determined by an average density of a standard negative film, the type of film, properties of printing paper, and the like A color negative film, however, differs in an orange base density, color development characteristics of a dye, the sensitivity of a dye layer of each of R, G, and B, and the like in accordance with the film manufacturer or the type of a film, i.e., values of the constants $\alpha_i$ and $\beta_i$ differ between films. Therefore, the values of the constants $\alpha_i$ and $\beta_i$ must be determined for each negative film and the predetermined constants must be stored.

In addition, even if a photograph which does not satisfy Evans' theorem, e.g., a photograph of an evening glow or a photograph in which a color balance is intentionally disturbed by using a color filter or the like is printed within an exposure time satisfying equation (1), a desired color is not reproduced in an obtained print.

SUMMARY OF THE INVENTION:

The present invention has been made in consideration of the above situation, and has as its object to provide a color image reading apparatus for reading a color image with a proper color balance.

It is another object of the present invention to provide a color image reading apparatus capable of outputting a color signal with a proper color balance even if the apparatus reads a color image in which a color balance is disturbed.

It is still another object of the present invention to provide a color image reading apparatus capable of properly reading the color image, a color balance of which is difficult to visually discriminate, such as a color negative film.

The above and other objects and effects of the present invention will be more fully apparent from the following detailed description.

Figure 1:
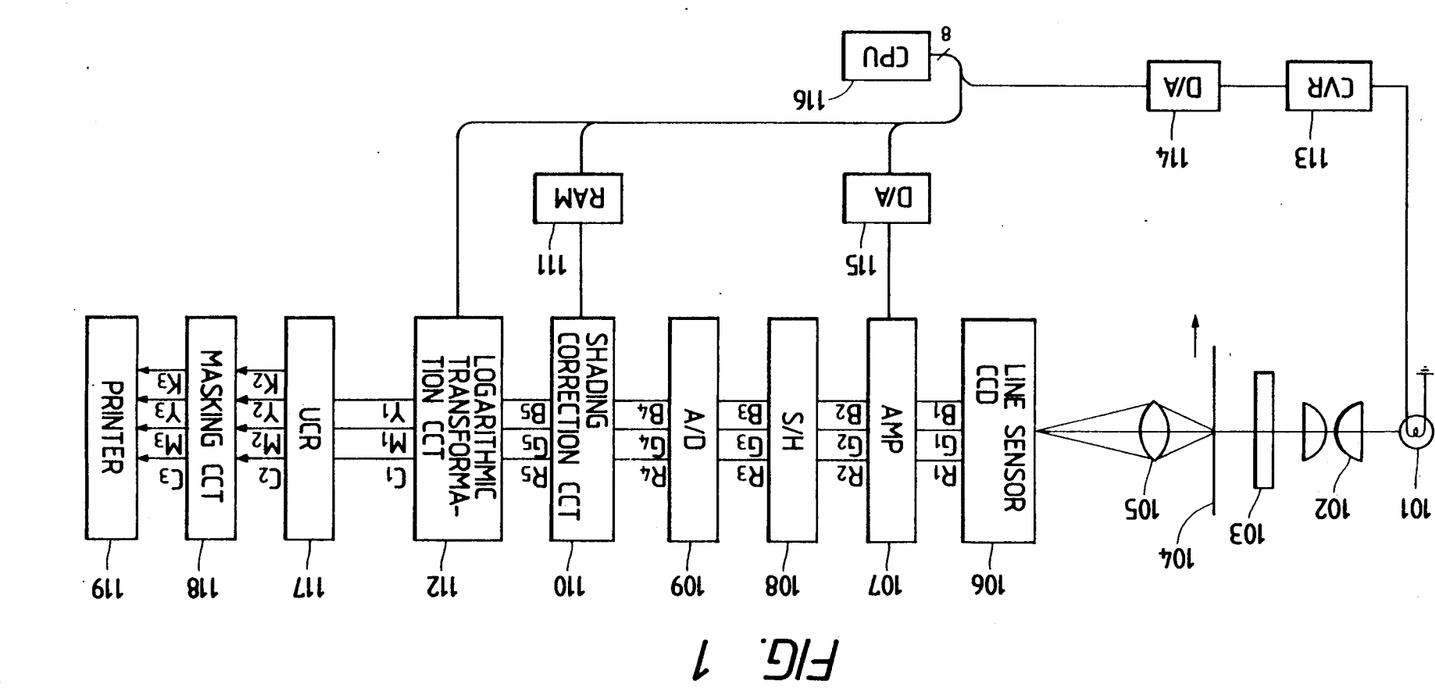
FIG. 1 is a block diagram showing a color negative film reading apparatus according to the first embodiment of the present invention.

DETAILED DESCRIPTION OF THE PREFERRED EMBODIMENTS:

FIG. 1 shows the first embodiment of a color image reading apparatus according to the present invention. Referring to FIG. 1, a halogen lamp 101 transmission-illuminates a film 104, and a condenser lens 102 converts light from the light source into collimated light. A heat-absorbing filter 103 is arranged between the condenser lens 102 and the film 104. A focusing lens 105 focuses a film image, and a CCD line sensor 106 having three lines on which filters of three colors R, G, and B are coated converts the focused film image into an electrical signal. An amplifier 107 amplifies analog line sensor outputs of R, G, and B, a sample-hold circuit 108 sample-holds output signals from the amplifier 107, and an A/D converter 109 A/D-converts the sample-held signals. A shading correction circuit 110 corrects a sensitivity variation of the CCD line sensor 106 or an illumination variation of the illumination light, and a shading RAM 111 stores one line of correction data for shading correction for each of R, G, and B. The shading RAM 111 is also used as a temporary memory for storing a read signal. A logarithmic transformation circuit 112 is a density transforming means, constituted by a RAM, for transforming R, G, and B signals into density signals (C, M, and Y). A transformation table formed on the basis of an Evans' theorem (to be described later) is written in the logarithmic transformation circuit 112. A variable power source 113 supplies power to the light source 101. A central processing unit (CPU) 116 controls the logarithmic transformation circuit 112 and the RAM 111, controls a gain of the amplifier 107 via a D/A converter 115, and controls a voltage of the CVR 113 via a D/A converter 114. A UCR circuit 117 performs known UCR and black extraction for the logarithmically transformed density signal. A masking circuit 118 performs masking on the basis of the signal from the UCR circuit 117. A color LBP 119 of four colors outputs an image on the basis of the masked signal.

Figure 2:
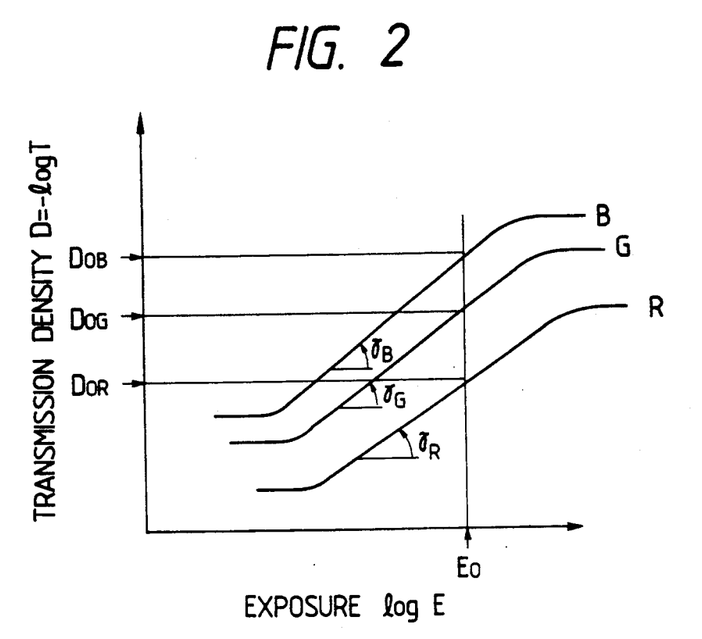
FIG. 2 is a graph showing a relationship between a logarithm of an exposure amount and a film transmission density.

The entire image on the color film 104 is scanned and read by a scanning mechanism (not shown) in a direction indicated by an arrow shown in FIG. 1. Gradation recording characteristics of the color negative film 104 are as shown in FIG. 2 in which the abscissa represents a logarithm of an exposure amount E and the ordinate represents a film transmission density ($=-\log T$, T : film transitivity). The R, G, and B dye layers are in a substantially proportional relationship in a normal exposure range. Assuming that inclinations ($\gamma$ values) of linear portions shown in FIG. 2 are $\gamma_R$, $\gamma_G$, and $\gamma_B$, the film transmission density $D_i$ (i=R, G, and B) at the linear portion can be represented by the following equation (2):

$$D_i = D_{0i} + \gamma_i \log(E/E_0) \qquad (2)$$

where $E_0$ and $D_{0i}$ are constants.

Although correlation between the linear portions varies in accordance with the type of a film, the inclination $\gamma_i$ is substantially the same regardless of the type of a film.

Measurement of an average transmission density $\overline{D}_i$ of a film to be read is performed by prescanning a plurality of lines of a predetermined region of the film 104 in units of lines, fetching image data for each line in the shading RAM 111, and adding the image data by the CPU 116. All of the average transmission densities $\overline{D}_i$ in units of colors are assumed to be empirically equivalent to a transmission density of a film photographing an achromatic color having a uniform reflectivity $r_H$ (normally 18% to 30%) of a camera subject under the same photographing conditions as in the above film. Therefore, equation (2) can be represented as equation (3) by using a certain exposure coefficient k:

$$\overline{D}_i = D_{0i} + \gamma_i \log(k r_H / E_0) \qquad (3)$$

A relationship between an image recorded on the film at the transmission density $D_i$ and the corresponding reflectivity r of a camera subject is represented by equation (4) by using k as in equation (3):

$$D_i = D_{0i} + \gamma_i \log(kr/E_0) \qquad (4)$$

From equations (3) and (4), a relationship between the film transmission density D and the reflectivity r of a camera subject can be represented as an equation (5):

$$D_i = \overline{D}_i - \gamma_i \log(r_H/r) \qquad (5)$$

Therefore, an equation for transforming the transmission density $D_i$ of an image on a film into a reflection density $d$ ($= -\log r$) of a camera subject is represented by the following equation (6) obtained by transforming equation (5):

$$d = -\log r = \frac{1}{\gamma_i}(D_i - \overline{D}_i) - \log r_H \qquad (6)$$

By representing the film transmission density $D_i$ by the film transitivity $T_i$ and deforming equation (6), the reflection density d of a camera subject can be represented by equation (7) in accordance with the relation $D_i = -\log T_i$:

$$d = \frac{1}{\gamma_i} \log\left(\frac{10^{\overline{D}_i}}{r_H^{\gamma_i}} \cdot T_i\right) \qquad (7)$$

Since the film transitivity $T_i$ corresponds to an output from the CCD 106, the film transitivity $T_i$ can be transformed into the reflection density d of a camera subject. By performing this transformation for each of R, G, and B, a density signal averagely equivalent to an achromatic color can be obtained, thereby realizing the Evans' theorem.

In the circuit configuration shown in FIG. 1, therefore, data obtained by reading several lines of an image of a negative film is averaged by the shading RAM 111 and the CPU 116 to obtain the average transmission density $\overline{D}_i$. On the basis of the constant $r_i$ corresponding to the negative film and the predetermined reflectivity $r_H$ of a camera subject, the CPU 116 calculates d with respect to $T_i$ by using equation (7) and writes the result as a transformation table in the logarithmic transformation circuit 112. The logarithmic transformation circuit 112 transforms the R, G, and B signals obtained by reading the negative film into C, M, and Y signals having a proper color balance by using the above Evans' theorem.

(2nd Embodiment)

Figure 4:
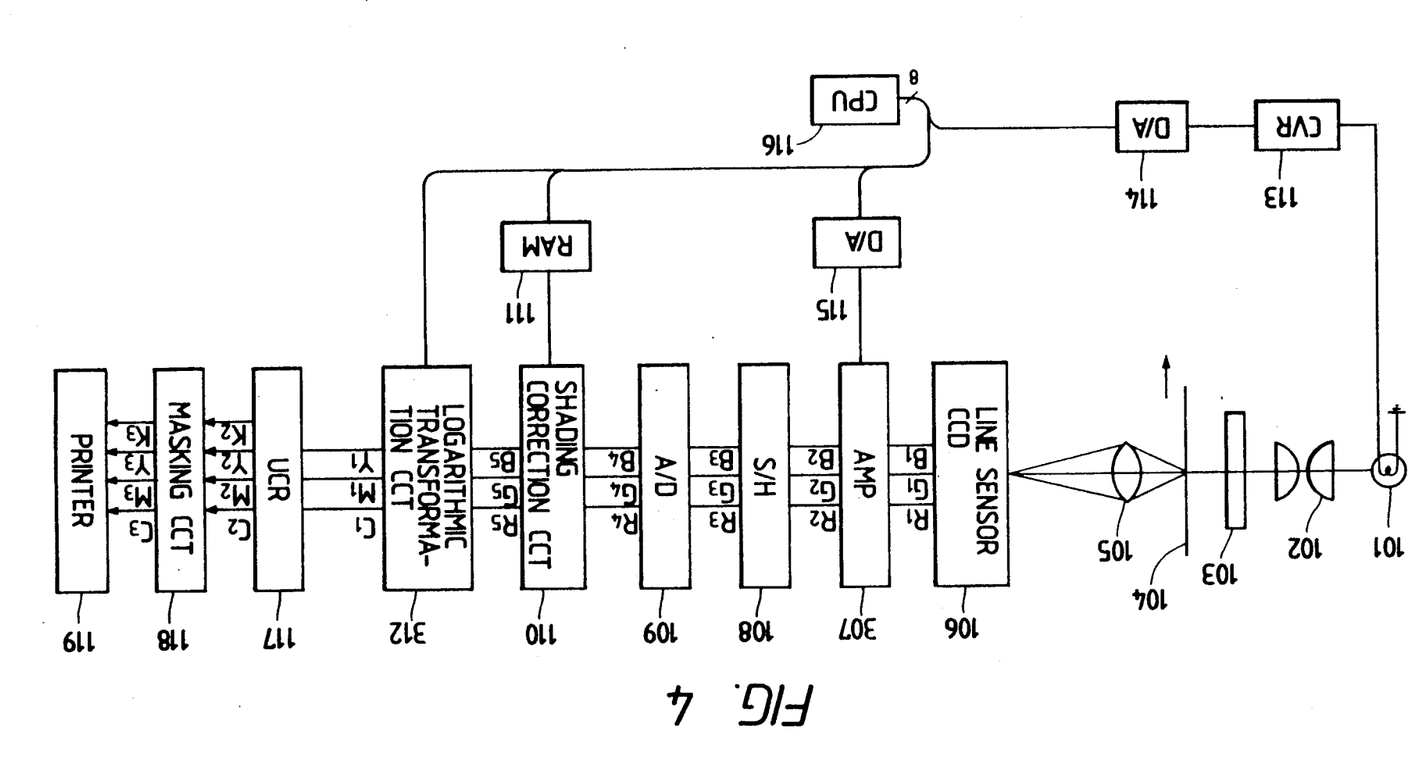
FIG. 4 is a block diagram showing a color negative film reading apparatus according to the second embodiment of the present invention.

FIG. 4 shows the second embodiment obtained by slightly modifying the arrangement shown in FIG. 1.

A difference from the first embodiment is that, in the second embodiment, an output from a CCD 106 is amplified by $n_i$ times by an amplifier 307 and A/D-converted by an A/D converter 109, and a logarithmic transformation circuit 312 calculates equation (11).

Since the output from the CCD 106, i.e., a film transitivity $T_i$ is amplified by $n_i$ times by the amplifier 307, equation (7) can be represented as equation (8):

$$d = \frac{1}{\gamma_i} \log \left( \frac{10^{Di}}{r_H \gamma_i \cdot n_i} T_i' \right) \quad (8)$$

for $T_i' = T_i n_i$.

Assuming that $T_i' = 1$ (in this case, a maximum value of a quantization level is represented as 1. Actually, however, each term of equation (8) must be expressed as a digital amount) is obtained when $d = d_{max}$ ($d_{max}$ is a maximum value of a density of a camera subject to be read), the following equation is obtained from equation (8):

$$d_{max} = \frac{1}{\gamma_i} \log \left( \frac{10^{Di}}{r_H \gamma_i \cdot n_i} \right) \quad (9)$$

By solving equation (9):

$$n_i = 10^{(D_i - \gamma_i d_{max})} / r_H \gamma_i \quad (10)$$

By substituting equation (10) into equation (8) to obtain equation (11):

$$d = d_{max} + \frac{1}{\gamma_i} \cdot \log T_i' \quad (11)$$

With the above arrangement, a quantization error can be effectively reduced.

(3rd Embodiment)

Figure 3:
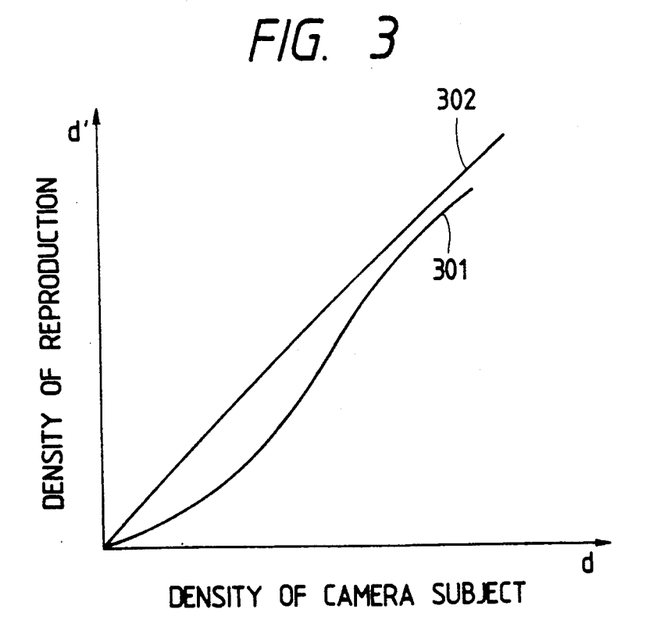
FIG. 3 is a graph showing a relationship between a density d of a camera subject and a density of reproduction d'.

In this embodiment, a relationship between a density of a camera subject and an output image density differs from that in the first embodiment. That is, the first embodiment uses a curve 302 representing a substantially proportional relationship between the density of a camera subject and the output image density shown in FIG. 3. In the third embodiment, however, a curve 301 obtained in consideration of human visual characteristics shown in FIG. 3 is used.

When the curve 301 is represented by $d' = f(d)$, equation (7) can be represented as equation (12):

$$d' = f(d) = f\left[ \frac{1}{\gamma_i} \log \left( \frac{10^D}{r_H \gamma_i} \cdot T_i \right) \right] \quad (12)$$

Conditions for minimizing a quantization error are assumed as the same as equation (10). Therefore, assuming that $T_i' = n_i T_i$, the logarithm transformation equation can be similarly represented as equation (13):

$$d' = f\left[ d_{max} + \frac{1}{\gamma_i} \log T_i' \right] \quad (13)$$

With the above arrangement, the output image density with respect to the density of a camera subject can be effectively improved in terms of a human visual sense.

(4th Embodiment)

Figure 5:
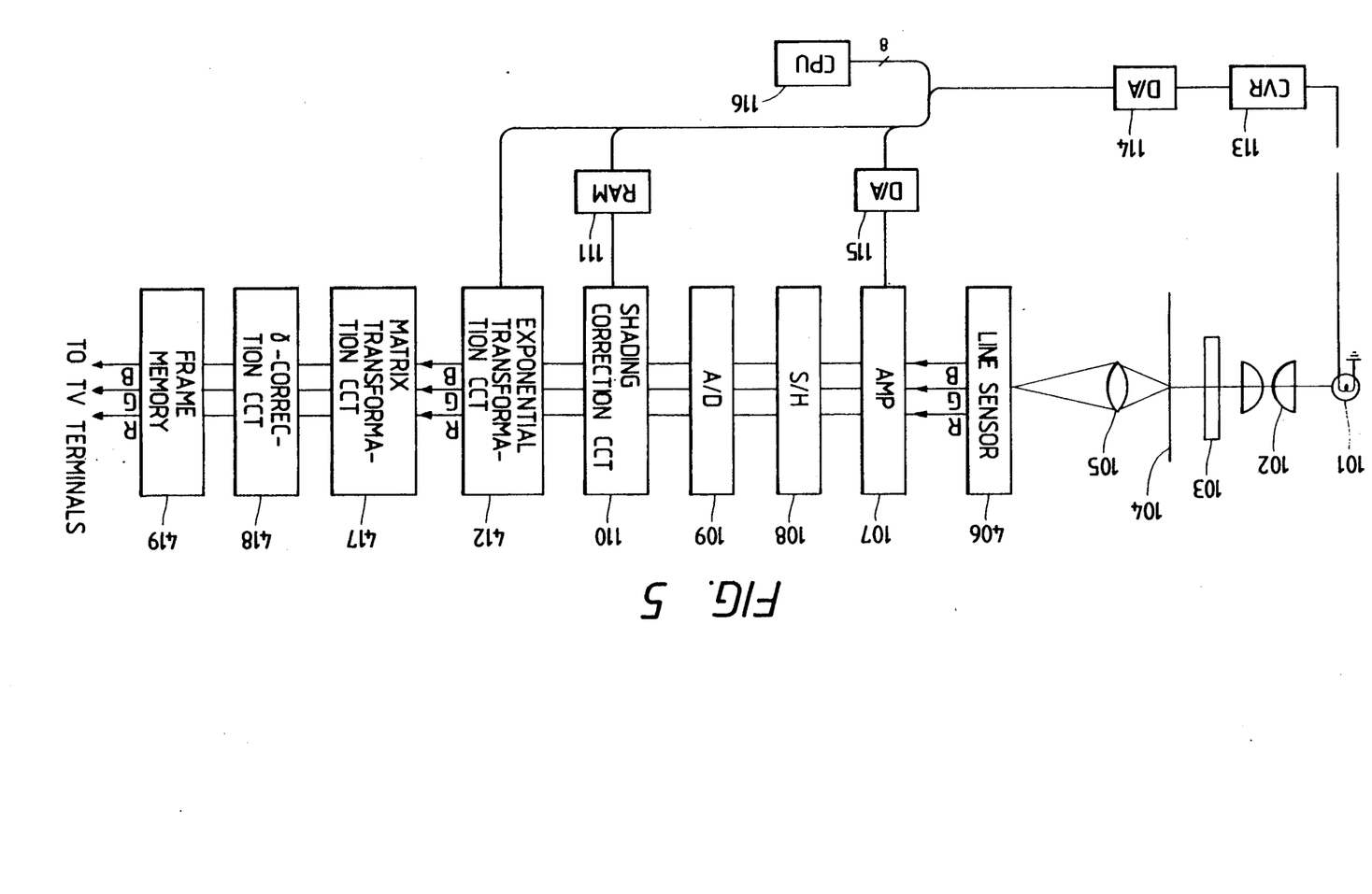
FIG. 5 is a block diagram showing a color negative film reading apparatus according to a fourth embodiment of the present invention.

FIG. 5 shows the fourth embodiment of the present invention.

In FIG. 5, the same reference numerals as in FIG. 1 denote the same parts. Referring to FIG. 5, a mosaic filter type CCD area sensor 406 separates one frame of a film into colors of R, G, and B. An exponential transformation circuit 412 exponentially transforms an output from a shading correction circuit 110. A look-up table for transformation can be written in the exponential transformation circuit by a CPU 116. A matrix transformation circuit 417 matrix-transforms an output from the exponential transformation circuit 412 to perform color correction. A $\gamma$-correction circuit 418 performs $\gamma$-correction for an output from the matrix transformation circuit 417, thereby correcting a phosphor emission characteristics of a television. (A $\gamma$ value of a television monitor is normally 2.2, and the $\gamma$-correction circuit 418 corrects this value.) A frame memory 419 stores one frame of R, G, and B signals obtained as described above and generates a television scan signal.

In order to obtain a television signal, the R, G, and B signals from the exponential transformation circuit 412 must be proportional to a reflectivity of a camera subject. The reflectivity r of a camera subject and the density d of a camera subject satisfy a relation $d = -\log r$. In addition, assuming that a reflectivity of the darkest portion to be reproduced is $r_{min}$, $d_{max} = -\log r_{min}$. Therefore, by substituting these equations into equation (11), the following equation (14) is obtained:

$$r = r\min(Ti') - \frac{1}{\gamma_i} \quad (14)$$

By writing a look-up table for realizing equation (14) in the exponential transformation circuit 412, luminance information of a camera subjet is effectively reproduced on a television monitor.

Instead of changing a gain of an amplifier 107, a light amount of a light source 101 may be changed, or an ND filter or Y, M, and C filters normally used in a photograph printer may be used. Alternatively, a storage time of the CCD may be changed for each of R, G, and B, or a reference voltage of A/D conversion may be changed.

With the arrangement described above, a positive print having a good color balance can be effectively obtained regardless of the type of a film.

(5th Embodiment)

Figure 6:
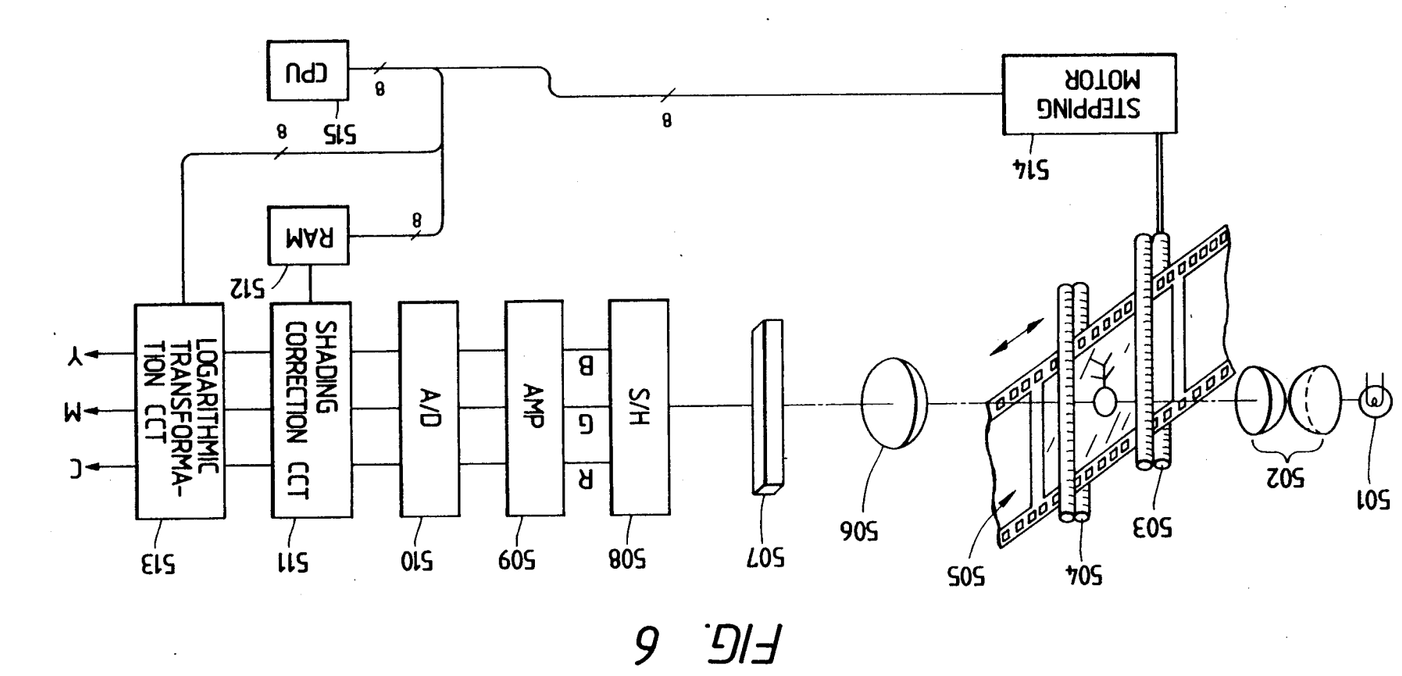
FIG. 6 is a block diagram showing a color negative film reading apparatus according to a fifth embodiment of the present invention.

FIG. 6 shows the fifth embodiment of the present invention. Referring to FIG. 5, a halogen lamp 501 transmission-illuminates a color negative film 505, a condenser lens 502 converts light from a light source into collimated light. A capstan roller 503 moves a film in a direction perpendicular to an optical axis, i.e., in a direction indicated by an arrow in FIG. 6. A film guiding capstan roller 504 guides a color negative film original 505 to be read. A focusing lens 506 focuses a film image. A CCD sensor 507 has three lines on which filters of three colors R, G, and B are coated and converts the focused image into color-separated electrical signals of three colors. A sample-hold circuit 508 sample-holds an output from the CCD sensor 507 to obtain an RGB time-serial signal. An operational amplifier 509 amplifies R, G, and B outputs from the sample-hold circuit 508. An A/D converter 510 A/D-converts outputs from the operational amplifier 509. A shading correction circuit 511 corrects a sensitivity variation of the CCD sensor 507 and an illumination variation in illumination light and outputs 8-bit digital R, G, and B signals. A shading RAM 512 stores one line of correction data for shading correction for each of R, G, and B. A logarithmic transformation circuit as density transforming means has a RAM for storing a look-up table and transforms the R, G, and B signals into 8-bit digital density signals C (cyan), M (magenta), and Y (yellow).

The look-up table of the logarithmic transformation circuit 513 stores C, M, and Y of the following equation (15):

$$C = 255 - \{-K_R \log(R/255)\}$$
$$M = 255 - \{-K_G \log(G/255)\}$$
$$Y = 255 - \{-K_B \log(B/255)\} \quad (15)$$

where $K_R$, $K_G$, and $K_B$ are predetermined constants.

A stepping motor 514 drives the capstan roller 503. A CPU 515 performs a write operation for the RAM 512 and the RAM of the logarithmic transformation circuit 513 and controls the stepping motor 514.

Figure 7:
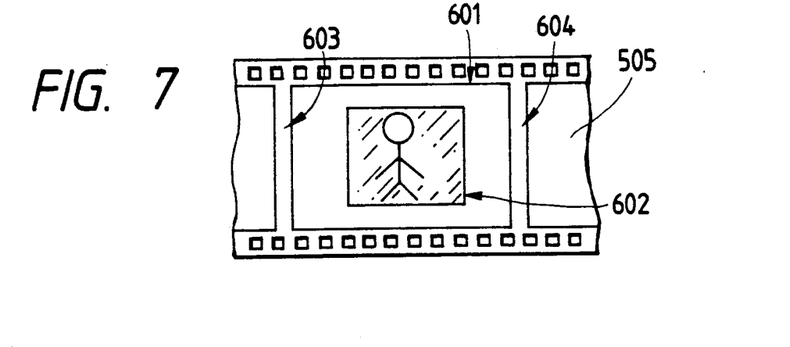
FIG. 7 is a schematic view showing a color negative film.

FIG. 7 shows a color negative film. Referring to FIG. 7, a photographed frame 601 has a scan region 602 to be scanned for average transmission density detection. Non-exposed portions 603 and 604 are formed between frames. The non-exposed portion is normally an orange mask itself.

Figure 8A:
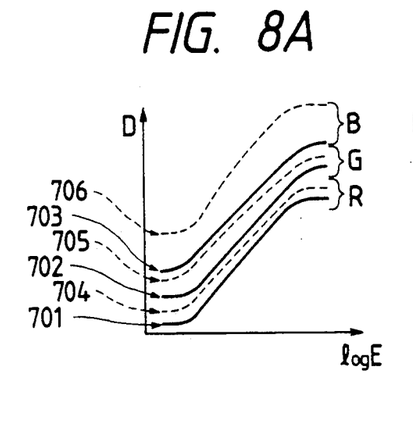
FIG. 8A is a graph showing characteristics of the average transmission density as a function of exposure amounts of two types of films.
Figure 8B:
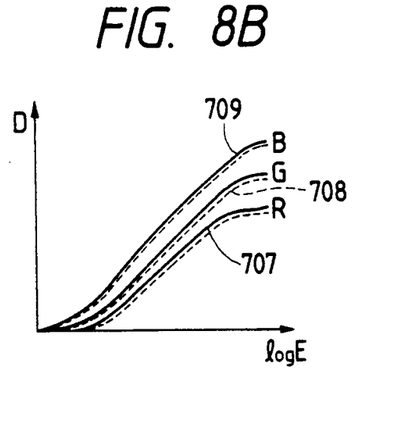
FIG. 8B is a graph showing characteristics of an average transmission density as a function of an exposure amount obtained when an orange mask density is subtracted from each of R, G, and B.

FIG. 8A shows gradation recording characteristics of a color negative film. The gradation recording characteristics are represented by solid lines 701, 702, and 703 for a certain film, while they are represented by dotted lines 704, 705, and 706 for another. These characteristics do not coincide with each other if types of films are different. FIG. 8B shows a relationship between a transmission density obtained by subtracting an orange mask density from each of R, G, and B and an exposure amount. As is apparent from FIG. 8B, characteristics of two types of films represented by solid and broken lines substantially coincide with each other after the orange mask density is subtracted.

Color negative film reading procedures will be described below.

(1) For a color negative film having a good color balance

A relation $\overline{C} = \overline{M} = \overline{Y}$ must be satisfied on the basis of the Evans' theorem between average values $\overline{C}$, $\overline{M}$, and $\overline{Y}$ of C, M, and Y in the scan region.

That is, equation (15) is rewritten into equation (16) by using average transmission densities $\overline{D}_R$, $\overline{D}_G$, and $\overline{D}_B$ of R, G, and B detected by scanning the scan region 602 of the color negative film 505 by the CCD sensor 507. The transformation table in the logarithmic transformation circuit 513 is rewritten in accordance with a relationship between R, G, and B and Y, M, and C obtained from equation (16). R, G, and B are transformed in accordance with this table and output from the logarithmic transformation circuit 513.

$$C = 255 - \{-K_R \log(R/255)\} + aK_R\overline{D}_R$$
$$M = 255 - \{-K_R \log(G/255)\} + aK_G\overline{D}_G$$
$$Y = 255 - \{-K_R \log(B/255)\} + aK_B\overline{D}_B \quad (16)$$

where a is a constant determined in accordance with the form of a processing system.

In this manner, the Evans' theorem is satisfied, and processing is performed such that an average color in the frame becomes an achromatic color.

(2) For a color negative film having a disturbed color balance

Figure 9:
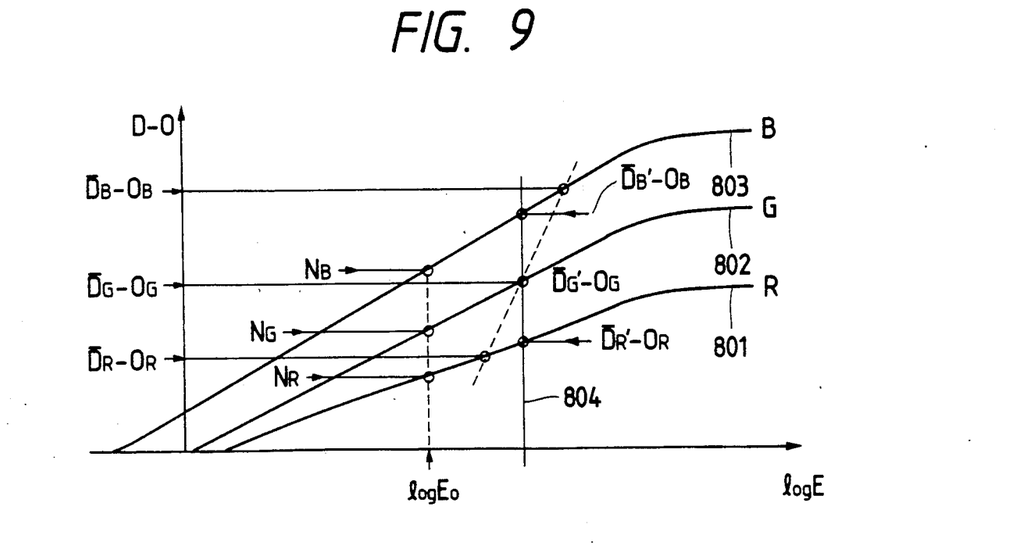
FIG. 9 is a graph showing a relationship between a difference between an average transmission density and an orange mask density of a standard negative film and an exposure amount.

FIG. 9 shows a relationship between a difference between a transmission density of a standard negative film (obtained by photographing a standard camera subject outdoors in a fine day) and an orange mask density.

Differences $\overline{D}_R - O_R$, $\overline{D}_G - O_G$, and $\overline{D}_B - O_B$ between average transmission densities $\overline{D}_R$, $\overline{D}_G$, and $\overline{D}_B$ and orange mask densities $O_R$, $O_G$, and $O_B$, however, correspond to the difference exposure amounts on the characteristic curves shown in FIG. 9. In this case, densities on a straight line 804 correspond to differences $\overline{D}_R' - O_R$, $\overline{D}_G' - O_G$, and $\overline{D}_B' - O_B$ between the average densities and the orange mask densities.

Assuming that film densities with respect to a certain exposure amount $\log E_0$ are $N_R$, $N_G$, and $N_B$ and inclinations of linear portions of curves 401, 402, and 403, are $\gamma_R$, $\gamma_G$, and $\gamma_B$, the average transmission densities $\overline{D}_R$, $\overline{D}_G$, and $\overline{D}_B$ are obtained as follows:

$$\overline{D}_R' = N_R + (\gamma_R/\gamma_G)(\overline{D}_G - O_G - N_G) + O_R$$
$$\overline{D}_G' = \overline{D}_G$$
$$\overline{D}_B' = N_B + (\gamma_B/\gamma_G)(\overline{D}_G - O_G - N_G) + O_B \quad (17)$$

By replacing $\overline{D}_R$, $\overline{D}_G$, and $\overline{D}_B$ in equations (16) with $\overline{D}_R'$, $\overline{D}_G'$, and $\overline{D}_B'$, respectively, and substituting $\overline{D}_R'$, $\overline{D}_G'$, and $\overline{D}_B'$ in equations (17) into equations (16), a relationship between R, G, and B and Y, M, and C is obtained and used as a transformation table of the logarithmic transformation circuit 513. As a result, C, M, and Y which maintain a color balance upon photography are output from the logarithmic transformation circuit 113. Actually, $\gamma_R$, $\gamma_G$, $\gamma_B$, $N_R$, $N_G$, and $N_B$ are stored as common values to any film, and the orange mask 603 or 604 of the film shown in FIG. 7 is read by the CCD sensor 507 to measure the orange mask densities $O_R$, $O_G$, and $O_B$. In addition, several lines are read in the region 202 by the CCD sensor 507 to measure the average transmission density $\overline{D}_G$, and equation (17) is applied.

In this embodiment, a portion between image frames is focused on the CCD sensor 507 to read a density of a film non-exposed portion. The same film, however, as a film to be used may be developed without exposure and set at a read position shown in FIG. 6 prior to image reading, thereby reading the orange mask densities $O_R$, $O_G$, and $O_B$, and then an image film may be set at the read position to read the average transmission densities $\overline{D}_R$, $\overline{D}_G$, and $\overline{D}_B$.

In addition, a plurality of non-exposed and developed films may be set at the read position to measure and store the orange mask densities $O_R$, $O_G$, and $O_B$ in a memory so that an operator can select the memory contents in accordance with each film to be used.

As described above, according to the fifth embodiment having the above arrangement, desired colors can be reproduced from a color negative film not satisfying the Evans' theorem.

The preferred embodiments of the present invention have been described above. The present invention, however, is not limited to these embodiments. For example, the present invention can be applied to reading of a color image other than a color negative film. In addition, logarithmic transformation can be executed not by a table look-up scheme but by an operation using a microcomputer. That is, the present invention can be variously modified and changed within the scope of the appended claims.

What is claimed is:

1. A color image reading apparatus comprising:
reading means for color-separating and reading a color image;
operating means for obtaining an average value of each of a plurality of color-component signals output from said reading means; and
transforming means for transforming the plurality of color-component signals from said reading means into a plurality of color density signals, wherein said transforming means performs transformation such that average values of the plurality of color-density signals become substantially equal to each other on the basis of the average values of the plurality of color-component signals obtained by said operating means.

2. An apparatus according to claim 1, wherein said transforming means performs transformation by using a transformation table formed on the basis of the average values of the plurality of color-component signals.

3. An apparatus according to claim 1, wherein said reading means reads a color image recorded on a color negative film.

4. An apparatus according to claim 2, further comprising forming means for forming the transformation table on the basis of the average values of the plurality of color-component signals.

5. An apparatus according to claim 3, wherein said transforming means performs transformation in consideration of a density of a base of the color negative film.

6. A color image reading apparatus comprising:
reading means for color-separating and reading light transmitted through a color negative film;
operating means for obtaining an average value of each of a plurality of color-component signals output by reading an image portion of the color negative film by said reading means; and
transforming means for transforming the plurality of color-component signals from said reading means into a plurality of color-density signals, wherein said transforming means performs transformation such that average values of the plurality of color-density signals become substantially equal to each other on the basis of the average values of the plurality of color-component signals obtained by said operating means.

7. An apparatus according to claim 6, wherein said transforming means performs transformation by using a transformation table formed on the basis of the average values of the plurality of color-component signals.

8. An apparatus according to claim 6, wherein said transforming means transforms the plurality of color-component signals into a plurality of reflection density signals.

9. An apparatus according to claim 6, wherein said transforming means transforms the plurality of color-component signals into a plurality of luminance signals.

10. An apparatus according to claim 7, further comprising forming means for forming the transformation table on the basis of the average values of the plurality of color-component signals.

11. An apparatus according to claim 6, wherein said transforming means performs transformation in consideration of a density of a base of the color negative film.

12. A color image reading apparatus comprising:
reading means for color-separating and reading light transmitted through a color negative film;
operating means for obtaining an average image density from an average value of each of a plurality of color-component signals output by reading an image portion of the color negative film by said reading means;
detecting means for detecting a base density of a base portion of the color negative film from the plurality of color-component signals output by reading the base portion by said reading means;
transforming means for transforming the plurality of color-component signals from said reading means into a plurality of color-density signals by using a transformation table; and
forming means for forming the transformation table on the basis of the average image density obtained by said operating means and the base density detected by said detecting means.

13. A color image processing method, comprising the steps of:
inputting a plurality of color-component signals representing a color image;
obtaining an average value of each of the plurality of color-component signals; and
transforming the plurality of color-component signals into a plurality of color-density signals, so that average values of the plurality of color-density signals become substantially equal to each other on the basis of the average values of the plurality of color-component signals.

14. An method according to claim 13, wherein, in said transforming step, the transformation is carried out using a transformation table formed on the basis of the average values of the plurality of color-component signals.

15. An method according to claim 13, wherein, in said inputting step, the color image is on a color negative film.

16. An method according to claim 14, further comprising the step of forming the transformation table on the basis of the average values of the plurality of color-component signals.

17. An method according to claim 13, wherein, in said transforming step, transformation is performed in consideration of a density of a base of the color negative film.

* * * * *

UNITED STATES PATENT AND TRADEMARK OFFICE
CERTIFICATE OF CORRECTION

PATENT NO.  : 5,049,985
DATED       : September 17, 1991
INVENTOR(S) : KEN-ICHO OUTA It is certified that error appears in the above-identified patent and that said Letters Patent is hereby corrected as shown below: ON THE TITLE PAGE:

AT INVENTOR   Item [75]

"Ken-Ichi" should read --Ken-ichi--.

Signed and Sealed this

Tenth Day of November, 1992

Attest:

DOUGLAS B. COMER

Attesting Officer   Acting Commissioner of Patents and Trademarks

UNITED STATES PATENT AND TRADEMARK OFFICE
CERTIFICATE OF CORRECTION

PATENT NO. : 5,049,985

DATED : September 17, 1991

INVENTOR(S) : KEN-ICHI OUTA

Page 1 of 4

It is certified that error appears in the above-identified patent and that said Letters Patent is hereby corrected as shown below:

On the title page:

IN [54] TITLE

"IMAGES" should read --IMAGE-- and
"BASE" should read --BASED--.

COLUMN 1

Line 2, "IMAGES" should read --IMAGE--.
Line 3, "BASE" should read --BASED--.
Line 16, "U.S. applica-" should be deleted.
Line 17, "tion Nos. 544,240, 061,042 U.S. Pat. No. 4,734,762," should read --U.S. Pat. Nos. 4,679,073, 4,734,762--.
Line 18, "193,227 U.S. Pat. No." should be deleted.
Line 20, "in" should read --on--; "on" should read --in--; and "U.S. applica-" should be deleted.
Line 21, "tion Nos. 013,731" should be deleted and "119,906" should read --4,922,335.--.
Line 22, Line 22 should be deleted.
Line 53, "61-10817);" should read --61-10817):--.

COLUMN 2

Line 27, "the" should read --a-- and "a" should read --the--.

COLUMN 3

Line 48, "transitivity)." should read --transmittivity).--
Line 65, "predetermined-" should read --predetermined--.

UNITED STATES PATENT AND TRADEMARK OFFICE
CERTIFICATE OF CORRECTION

PATENT NO. : 5,049,985
DATED : September 17, 1991
INVENTOR(S) : KEN-ICHI OUTA

It is certified that error appears in the above-identified patent and that said Letters Patent is hereby corrected as shown below:

COLUMN 4

Line 30, "$d = -\log r = \frac{1}{\gamma_i}(D_i - D_i) - \log r_H \quad (6)$"

should read --$d = -\log r = \frac{1}{\gamma_i}(\overline{D_i} - D_i) - \log r_H \quad (6)$--.

Line 34, "film transivity $T_i$" should read --film transmittivity $T_i$-- and "deforming" should read --rewriting--.

Line 40, "$d = \frac{1}{\gamma_i} \log \left( \frac{10^{DI}}{r_{H\gamma i}} \cdot T_i \right) \quad (7)$" should read --$d = \frac{1}{\gamma_i} \log \left( \frac{10^{\overline{DI}}}{r_{H\gamma i}} \cdot T_i \right) \quad (7)$--.

Line 43, "film transitivity $T_i$" should read --film transmittivity $T_i$--.
Line 44, "film transitivity $T_i$" should read --film transmittivity $T_i$--.

COLUMN 5

Line 6, "transi-" should read --transmit- --.
Line 8, "represented" should read --rewritten--.

Line 11, "$d = \frac{1}{\gamma_i} \log \left( \frac{10^{DI}}{r_{H\gamma i} \cdot n_i} \; T_i' \right) \quad (8)$" should read --$d = \frac{1}{\gamma_i} \log \left( \frac{10^{\overline{DI}}}{r_{H\gamma i} \cdot n_i} \; T_i' \right) \quad (8)$--.

UNITED STATES PATENT AND TRADEMARK OFFICE
CERTIFICATE OF CORRECTION

PATENT NO. : 5,049,985
DATED : September 17, 1991
INVENTOR(S) : KEN-ICHI OUTA

Page 3 of 4

It is certified that error appears in the above-identified patent and that said Letters Patent is hereby corrected as shown below:

COLUMN 5

Line 24, "$d_{max} = \frac{1}{\gamma_i} \log\left(\frac{10^{DI}}{r_{H\gamma i} \cdot n_i}\right)$  (9)" should read --$d = \frac{1}{\gamma_i} \log\left(\frac{10^{\bar{D}I}}{r_{H\gamma i} \cdot n_i}\right)$  (9)--.

Line 30, "$n_i = 10^{(Di-\gamma i dmax)}/r_{H\gamma i}$  (10)" should read

--$n_i = 10^{(\bar{D}i-\gamma i dmax)}/r_{H\gamma i}$  (10)--.

Line 53, "represented" should read --rewritten--.

Line 56, "$d' = f(d) = f\left[\frac{1}{\gamma_i}\log\left(\frac{10^D \cdot T_i}{r_{H\gamma i}}\right)\right]$  (12)"

should read --$d' = f(d) = f\left[\frac{1}{\gamma_i}\log\left(\frac{10^{\bar{D}} \cdot T_i}{r_{H\gamma i}}\right)\right]$  (12)--.

COLUMN 6

Line 37, "$r = rmin(T_i') - \frac{1}{\gamma_i}$  (14)"

should read --$r = rmin(T_i')^{-\frac{1}{\gamma_i}}$  (14)--.

Line 41, "subjet" should read --subject--.
Line 44, "amount" should read --output--.

UNITED STATES PATENT AND TRADEMARK OFFICE
CERTIFICATE OF CORRECTION

PATENT NO. : 5,049,985
DATED : September 17, 1991
INVENTOR(S) : KEN-ICHI OUTA

It is certified that error appears in the above-identified patent and that said Letters Patent is hereby corrected as shown below:

<u>COLUMN 7</u>

Line 41, "teristics-" should read --teristics--.

<u>COLUMN 8</u>

Line 2, "-$K_R$log" should read -- -$K_G$log--.
    Line 4, "-$K_R$log" should read -- -$K_B$log--.
    Line 16, "in" should read --on--.
    Line 47, "common values" should read --values common--.

<u>COLUMN 10</u>

Line 49, "An" should read --A--.
    Line 54, "An" should read --A--.
    Line 57, "An" should read --A--.
    Line 61, "An" should read --A--.

Signed and Sealed this

Twenty-ninth Day of June, 1993

Attest:

MICHAEL K. KIRK

*Attesting Officer*      *Acting Commissioner of Patents and Trademarks*